US011299015B2

(12) United States Patent
Munoz et al.

(10) Patent No.: US 11,299,015 B2
(45) Date of Patent: Apr. 12, 2022

(54) AIR VENT FOR A VEHICLE

(71) Applicant: GM GLOBAL TECHNOLOGY OPERATIONS LLC, Detroit, MI (US)

(72) Inventors: Angel R. Munoz, Rochester Hills, MI (US); Steven J. Leathorn, Fort Gratiot, MI (US); Aldair Ramirez Nopaltitla, Toluca (MX)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 281 days.

(21) Appl. No.: 16/589,462

(22) Filed: Oct. 1, 2019

(65) Prior Publication Data
US 2021/0094392 A1    Apr. 1, 2021

(51) Int. Cl.
*B60H 1/34* (2006.01)

(52) U.S. Cl.
CPC ... *B60H 1/3421* (2013.01); *B60H 2001/3471* (2013.01)

(58) Field of Classification Search
CPC .................. B60H 1/3421; B60H 2001/3471
See application file for complete search history.

(56) References Cited

U.S. PATENT DOCUMENTS

| 2002/0081965 A1* | 6/2002 | Demerath | B60H 1/3421 |
| | | | 454/254 |
| 2006/0172680 A1* | 8/2006 | Gehring | B60H 1/3428 |
| | | | 454/152 |
| 2016/0288624 A1 | 10/2016 | Albin et al. | |

FOREIGN PATENT DOCUMENTS

| DE | 10226441 B3 | 3/2004 | |
| DE | 102007059190 A1 * | 3/2009 | B60H 1/3421 |
| DE | 102013101887 A1 | 9/2013 | |
| DE | 102016121937 A1 * | 5/2018 | B60H 1/3428 |
| DE | 102016121937 A1 | 5/2018 | |
| EP | 1712384 A2 | 10/2006 | |

* cited by examiner

*Primary Examiner* — Steven S Anderson, II
(74) *Attorney, Agent, or Firm* — Vivacqua Crane PLLC

(57) ABSTRACT

A vehicle air vent includes a primary vane system pivotal about a horizontal axis to direct an airflow from an outlet of the vehicle air vent in an up/down direction, a secondary vane system pivotal about a vertical axis to direct an airflow from an outlet of the vehicle air vent in a side-to-side direction. A primary vane of the primary vane system is co-located along an airflow path through the vehicle air vent with a secondary vane of the secondary vane system. The vehicle air vent further includes an airflow volume control system adapted to adjust the volume of airflow through the vehicle air vent, and a joystick controller adapted to independently operate the primary vane system, the secondary vane system, and the airflow volume control system.

14 Claims, 15 Drawing Sheets

AIR VENT FOR A VEHICLE

FIELD

The present disclosure relates to an air vent for a vehicle.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Modern passenger vehicles include a heating, ventilation, and air conditioning (HVAC) system that allows a vehicle occupant to control the temperature or adjust other settings of a vehicle interior. For instance, a motor-driven fan or blower circulates conditioned air to the vehicle interior through air vents. Some vehicles are equipped with heated and/or cooled seats, a heated steering wheel, and other features that collectively improve the overall drive experience. HVAC systems may include front and rear defrosters for improving visibility through the windshield and rear window, respectively. An occupant of the vehicle selects desired HVAC system settings using dials, knobs, push-buttons, and/or touch screens.

SUMMARY

In an exemplary aspect, a vehicle air vent includes a primary vane system pivotal about a horizontal axis to direct an airflow from an outlet of the vehicle air vent in an up/down direction, a secondary vane system pivotal about a vertical axis to direct an airflow from an outlet of the vehicle air vent in a side-to-side direction. A primary vane of the primary vane system is co-located along an airflow path through the vehicle air vent with a secondary vane of the secondary vane system. The vehicle air vent further includes an airflow volume control system adapted to adjust the volume of airflow through the vehicle air vent, and a joystick controller adapted to independently operate the primary vane system, the secondary vane system, and the airflow volume control system.

In another exemplary aspect, the secondary vane includes a secondary vane pivot shaft that extends vertically through the primary vane and the secondary vane is pivotal relative to the primary vane about the secondary vane pivot shaft.

In another exemplary aspect, the vehicle air vent further includes a secondary vane arm extending from the secondary vane pivot shaft and engaging a secondary vane control arm at a position that is offset from the secondary vane pivot shaft. The secondary vane control arm is connected to the joystick controller such that a side-to-side motion of the joystick controller pivots the secondary vane about the secondary vane pivot shaft to direct an airflow from the outlet of the vehicle air vent in the side-to-side direction.

In another exemplary aspect, the joystick controller includes a joystick knob, a joystick body with a joystick shaft extending from a spherical section of the joystick body, the joystick shaft engages the joystick knob, a joystick sphere housing that includes a left side sphere housing and a right side sphere housing that encloses the spherical section of the joystick body, and a primary vane pivot extending from the spherical section of the joystick body along a primary axis.

In another exemplary aspect, the vehicle air vent further includes a substantially u-shaped hinge portion extending from the primary vane pivot, a primary vane fork including a pair of tines extending rearwardly from a pivot connection with hinge portion extending from the primary vane pivot, and a primary control arm extending from the primary vane, where the primary control arm includes a primary control arm shaft that is aligned about an offset axis that is offset from a primary vane axis about which the primary vane is rotatable.

In another exemplary aspect, the primary vane includes an upper primary vane portion attached to a lower primary vane portion.

In another exemplary aspect, the secondary vane includes an upper secondary vane that includes an upper secondary vane pivot shaft that extends vertically downward through the upper primary vane portion, and a lower secondary vane that includes a lower secondary vane pivot shaft that extends vertically upward through the lower primary vane portion, where the upper secondary vane pivot shaft and the lower secondary vane pivot shaft are fixedly connected to each other and are freely rotatable about a vertical axis that extends through the primary vane, and where one of the lower secondary vane and the upper secondary vane includes a vane arm that extends rearwardly from a respective vane pivot shaft and which includes a secondary vane vertical protrusion at a distal end of the secondary vane arm.

In another exemplary aspect, the vehicle air vent further includes a secondary vane control arm pivotally connected to the secondary vane vertical protrusion, where the secondary vane control arm extends substantially completely through the primary vane between the upper primary vane portion and the secondary primary vane portion, a rearwardly extending arm extending rearwardly form the secondary vane control arm, an arcuate arm with a vertically oriented slot, where the rearwardly extending arm extends into the vertically oriented slot, a first gear attached to a lower portion of the arcuate arm, a second gear having second gear teeth engaging first gear teeth on the first gear, and a second gear key that a slot in a lower portion of the spherical section of the joystick body, where the slot in the lower portion of the spherical section is oriented in a forward/rearward direction.

In another exemplary aspect, the airflow volume control system includes a butterfly door having an upper door and a lower door that are each pivotal about a door pivot axis, where the upper door includes an upper door gear and the lower door includes a lower door gear, a pinion gear that is pivotally mounted on a pinion gear pivot that is fixed with respect to a housing of the vehicle air vent, where both of the upper door gear and the lower door gear are coaxial with the door pivot axis and each of them engage opposing sides of the pinion gear, a lower door extension extending from the lower door, an intermediate control arm connected to the lower door extension with a first universal joint, and a joystick door control arm connected to the intermediate control arm with a second universal joint and to an inner joystick body, where the inner joystick body includes a cylindrical section positioned within the spherical section of the joystick body in a manner which permits the inner joystick body to rotate along a joystick axis relative to the joystick body, where the inner joystick body further includes a protruding shaft on which the joystick knob is mounted, and where the joystick door control arm also includes a joystick key that is positioned within an inner slot in the cylindrical section of the inner joystick body.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
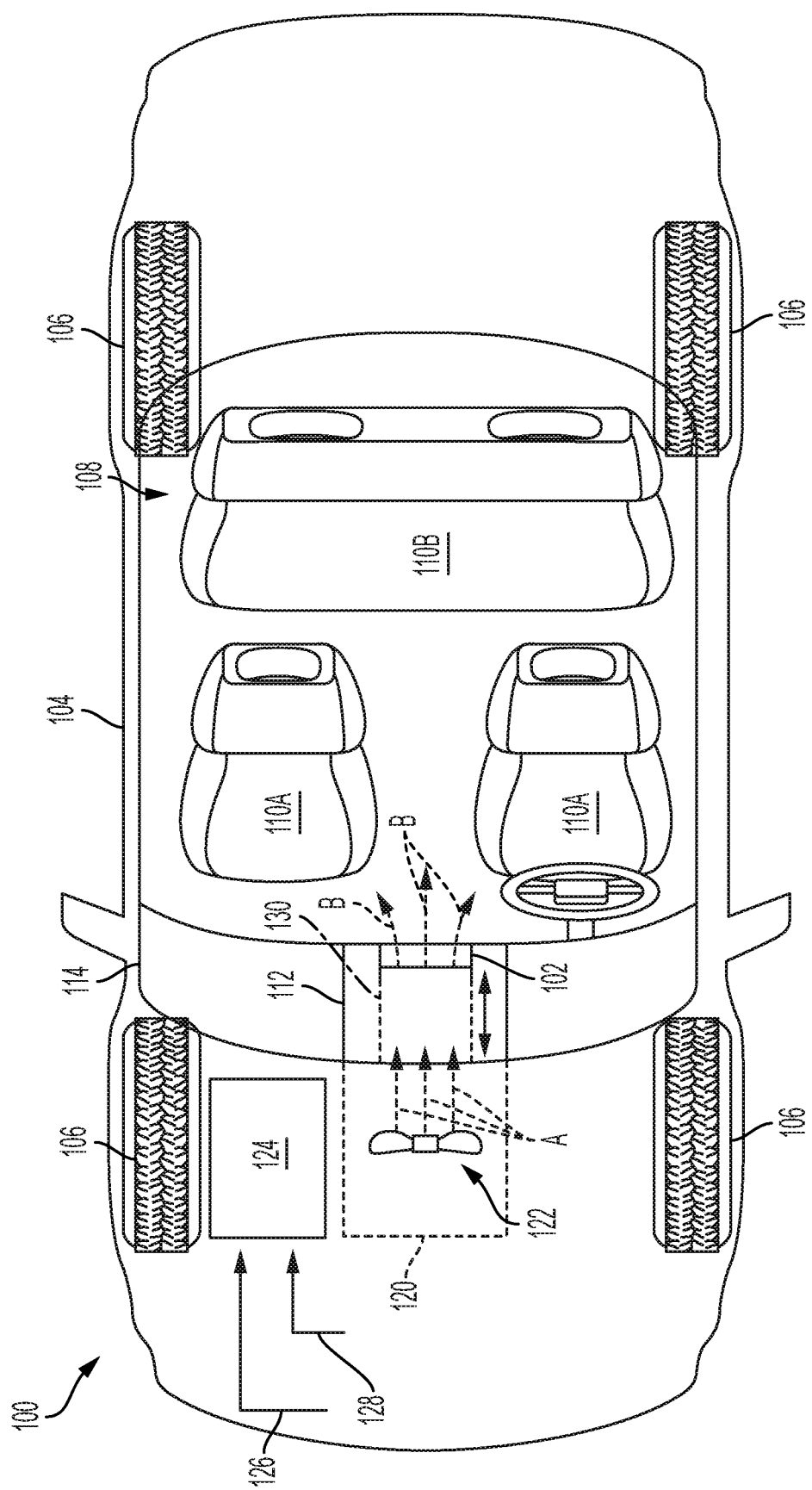
FIG. 1 is a schematic plan view of a vehicle incorporating an exemplary air vent in accordance with the present disclosure.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Referring now to the drawings, wherein like reference numbers correspond to like or similar components throughout the several figures, FIG. 1 is a schematic plan view of a vehicle 100 incorporating an exemplary air vent in accordance with the present disclosure. An exemplary vehicle 100, such as a motor vehicle, is shown in FIG. 1 having an air vent 102 as set forth herein. The vehicle 100 includes a body 104 located with respect to a set of wheels 106, with the body 104 defining an interior space 108, i.e., a passenger compartment or cabin. The interior space 108 depicts respective first and second rows of seats 110A, 110B. The first row of seats 110A may include respective driver-side and passenger-side seats as shown. Other seating configurations may be envisioned, including an embodiment of the interior space having only the first row of seats 110A, or an embodiment of the interior space having an additional row of seats, neither of which is shown. One example of an embodiment of the air vent 102 is depicted in the figures. It is appreciated that terms such as "above," "below," "upward," "downward," "top," "bottom," "left,", "right," "vertical," and "horizontal" etc., are used descriptively for the figures, and do not represent limitations on the scope of the disclosure.

Figure 2:
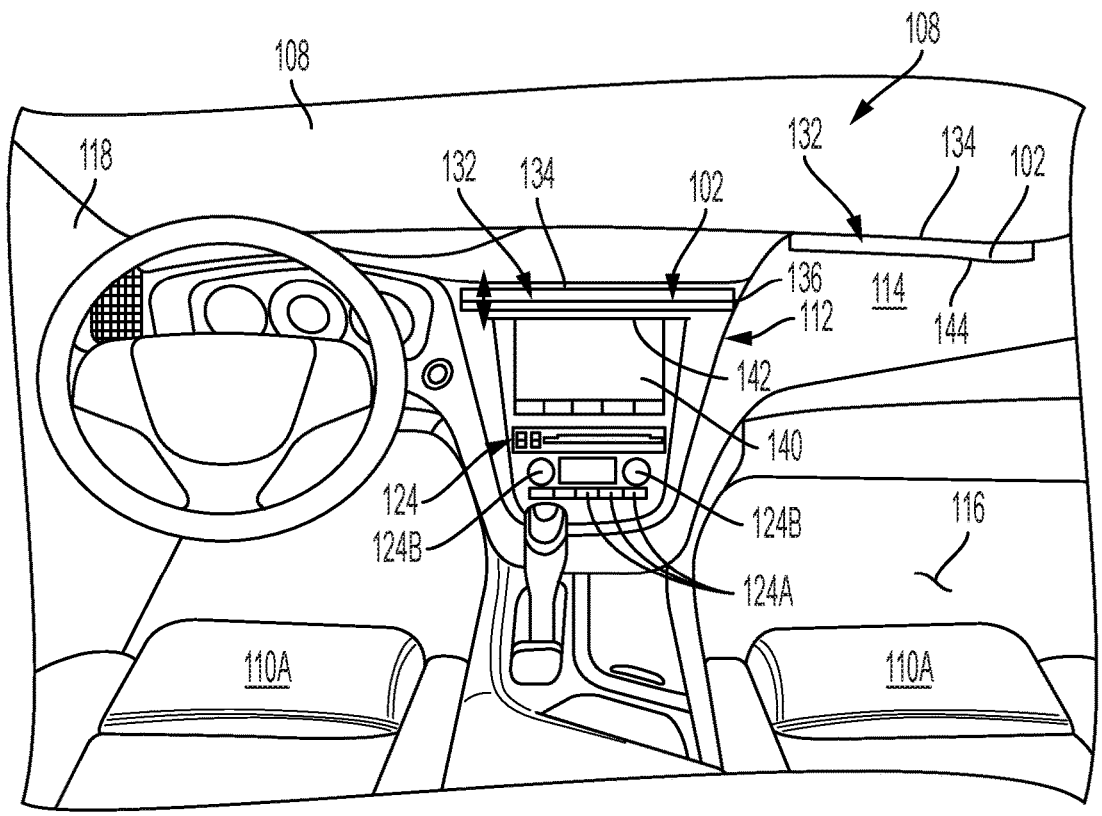
FIG. 2 is a perspective view of a vehicle interior having a center stack containing an exemplary air vent in accordance with the present disclosure.

A possible configuration and placement of the air vent 102 is shown in FIG. 2. The air vent 102 of FIG. 1 may be located within a center stack 112 of the interior space 108, adjacent to a dashboard 114. A center stack 112 is a control console located between the driver-side seat and the passenger-side seat, in the first row of seats 110A extending from the dashboard 114 toward a floor 116 of the interior space 108. Alternatively, the air vent 102 may be located elsewhere, including along the dashboard 114, within a vehicle ceiling space (not shown), within one or more roof pillars, e.g., an A-pillar 118, a B-pillar (not shown) between the front row of seats 110A and the rear row of seats 110B, and adjacent the rear row of seats 110B, by way of non-limiting examples. For example, the rear row of seats 110B may be divided into separate seating areas by an arm rest (not shown) or other structure, with the air vent 102 located within or adjacent to such structure.

The air vent 102 is in fluid communication with a heating, ventilation, and air conditioning (HVAC) system 120 having an air circulation device 122, for instance a motor-driven fan or blower, and a controller 124. The HVAC system 120 receives HVAC control setting signal (arrow 126) from the controller 124 in response to user-selected HVAC settings (arrow 128) from controls 124, such as buttons 124A, knobs 124B, and the like. In response to the received HVAC control setting signal (arrow 126), the HVAC system 120 directs ambient, heated, or cooled airflow (arrows A) into the interior space 108, for instance through a duct 130 and the air vent 102. In embodiments in which the air vent 102 is used in proximity to the rear row of seats 110B, the duct 130 may be extended beyond the front row of seats 110A such that the duct 130 supplies the airflow as indicated by arrows A to the air vent 102 wherever the air vent 102 is situated within the interior space 108. The airflow is directed by the air vent 102 into the vehicle interior space 108 in a desired direction, as indicated by arrow B.

FIG. 2 schematically shows one configuration of the interior space 108 with the air vent 102 shown located within the center stack 112 and visible to the vehicle occupants. The air vent 102 may have an outlet opening 132 having a generally rectangular profile having a pair of opposed first sides 134, extending along a length L, and a pair of opposed second sides 136, extending along a height H, with the aspect ratio being the ratio of the length L to the height H. A high aspect ratio indicates that the length L is significantly greater than the height H. By way of a non-limiting example, a high aspect ratio may be an aspect ratio that is 5:1. However, it should be appreciated that an air vent having a smaller aspect ratio may also be employed, including, but not limited to an aspect ratio of 1:1. The first and second sides 134, 136 cooperate to define the outlet opening 132, through which air exits the air vent 102. The air vent 102 may be disposed within the vehicle 100 to have a very elongated, narrow profile without sacrificing the ability to direct the flow of air (arrow B) in a desired direction within the interior space 108 of the vehicle 100 with a low pressure drop. The air vent 100 is located between a windshield 138 and a main display screen 140, i.e., adjacent to or along a top edge 142 of a main display screen 140, as viewed from the normal forward-looking driving perspective of an operator of the vehicle 100. However, as noted above the air vent 102 may also be located elsewhere in the interior space 108. For example, the air vent 102 may be located in location 144 as shown, which is forward of the passenger seat 110A. Placement of the air vent 102, regardless of the embodiment, may be in sufficiently close proximity to an occupant, whether a driver or a front/rear seat passenger of the vehicle 100 of FIG. 1, such that the occupant can comfortably reach the air vent 102 from a seated position.

Figure 3:
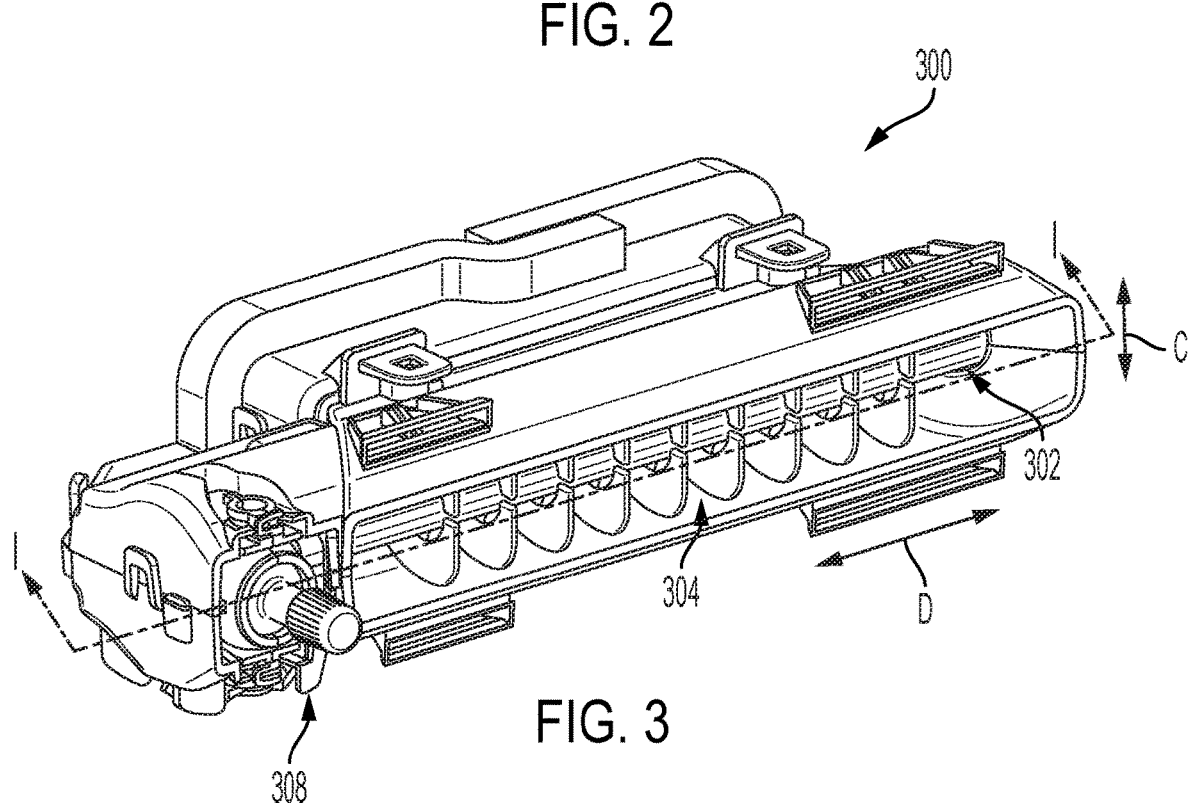
FIG. 3 is a perspective view of an exemplary vehicle air vent 300 in accordance with the present disclosure.

FIG. 3 is a perspective view of an exemplary vehicle air vent 300 in accordance with the present disclosure. The vehicle air vent 300 includes a primary vane system 302 and a secondary vane system 304 which are co-located along an airflow path through the vehicle air vent 300. In this manner, the space requirements for the vehicle air vent in a fore/aft direction may be significantly reduced from conventional vehicle air vent systems. The vehicle air vent 300 further includes an airflow volume control system 306 which is hidden from view in FIG. 3, but is illustrated and described below. The vehicle air vent 300 further includes a joystick controller 308 which provides independent control over operation of each of the primary vane system 302, the secondary vane system 304, and the airflow volume control system 306. In the exemplary vehicle air vent 300 the primary vane system 302 controls flow of air out of the vehicle air vent 300 in an up/down direction C, the secondary vane system 304 controls flow of air out of the vehicle air vent 300 in a side-to-side direction D, and the airflow volume control system 306 controls the volume of air flowing through the vehicle air vent 300.

Figure 4:
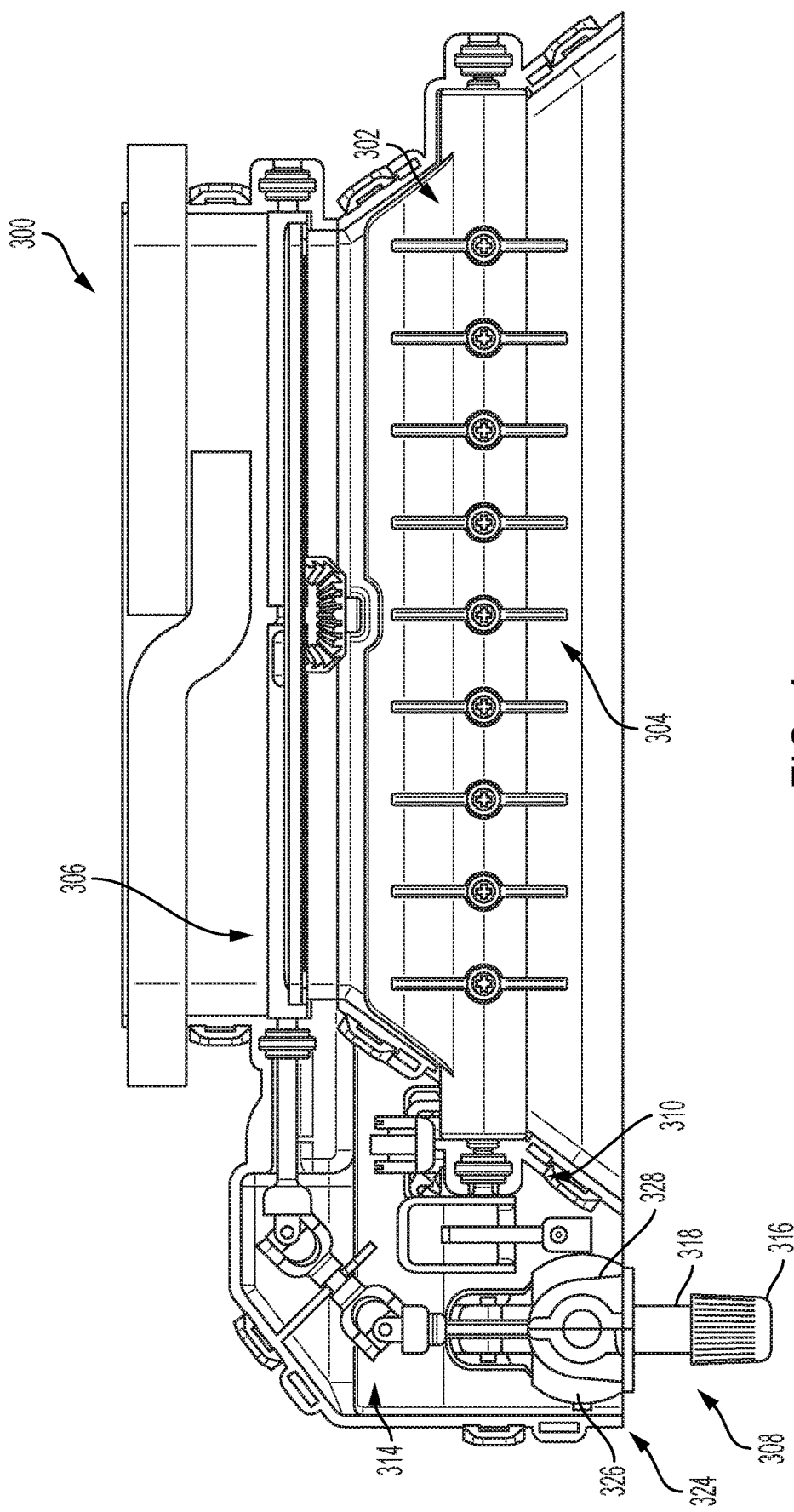
FIG. 4 is a cross-sectional plan view of the exemplary vehicle air vent 300.
Figure 5:
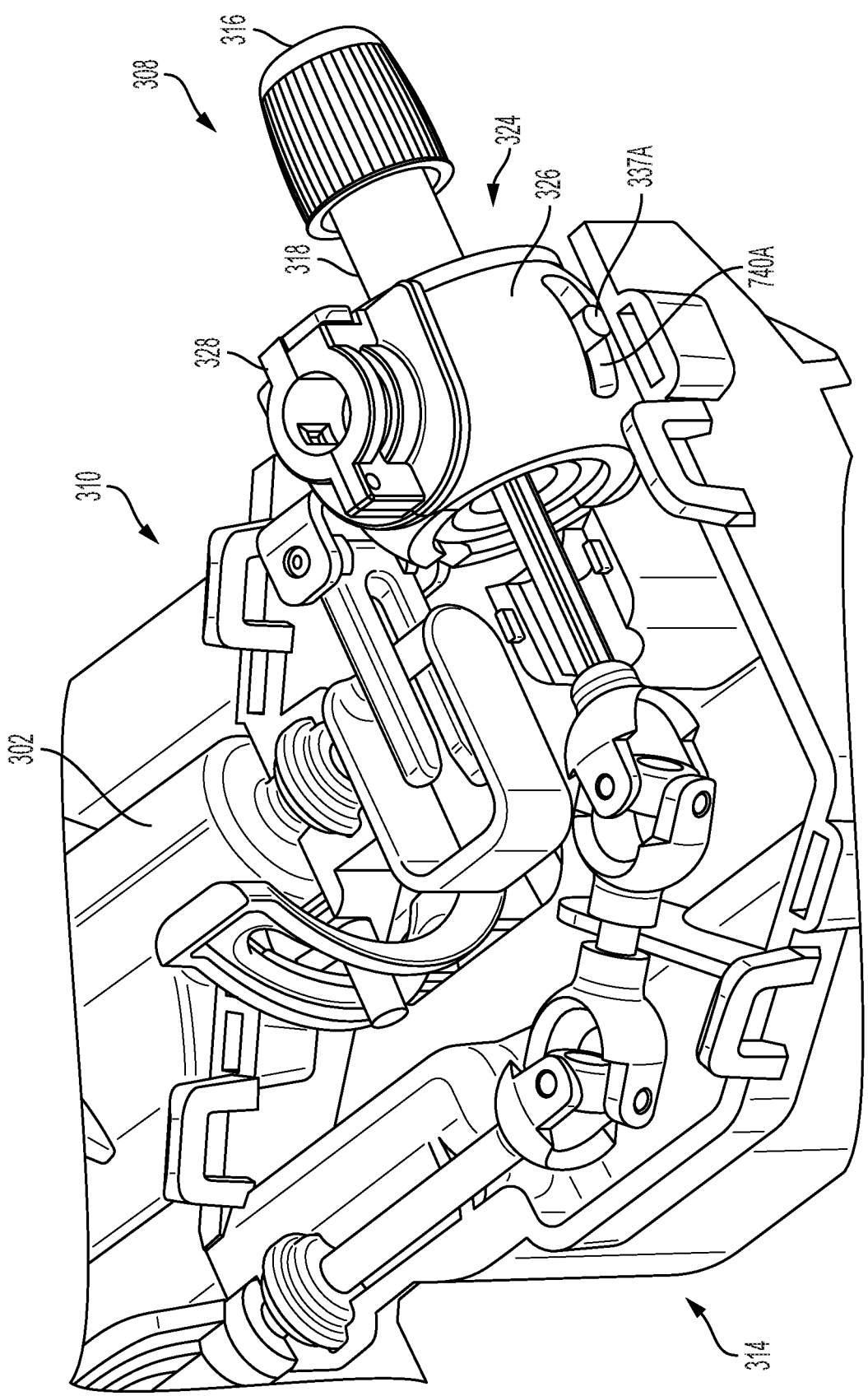
FIG. 5 provides a close-up view from another perspective of a joystick controller 308 of the exemplary vehicle air vent 300.

FIG. 4 is a cross-sectional plan view of the exemplary vehicle air vent 300 taken along line I-I of FIG. 3 and FIG. 5 provides a close-up view from another perspective of the joystick controller 308 of the vehicle air vent 300. The joystick controller 308 includes a primary vane controller 310, a secondary vane controller 312 (not visible in FIGS. 4-5), and an airflow volume controller 314, each of which will be described in further detail with reference to FIGS. 6-19.

Figure 6A:
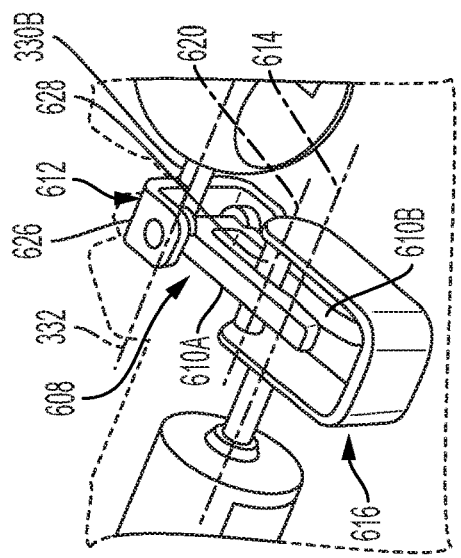
FIG. 6 illustrates a primary vane system 302 and primary vane controller 310 of the exemplary vehicle air vent 300 of the present disclosure.
Figure 6:
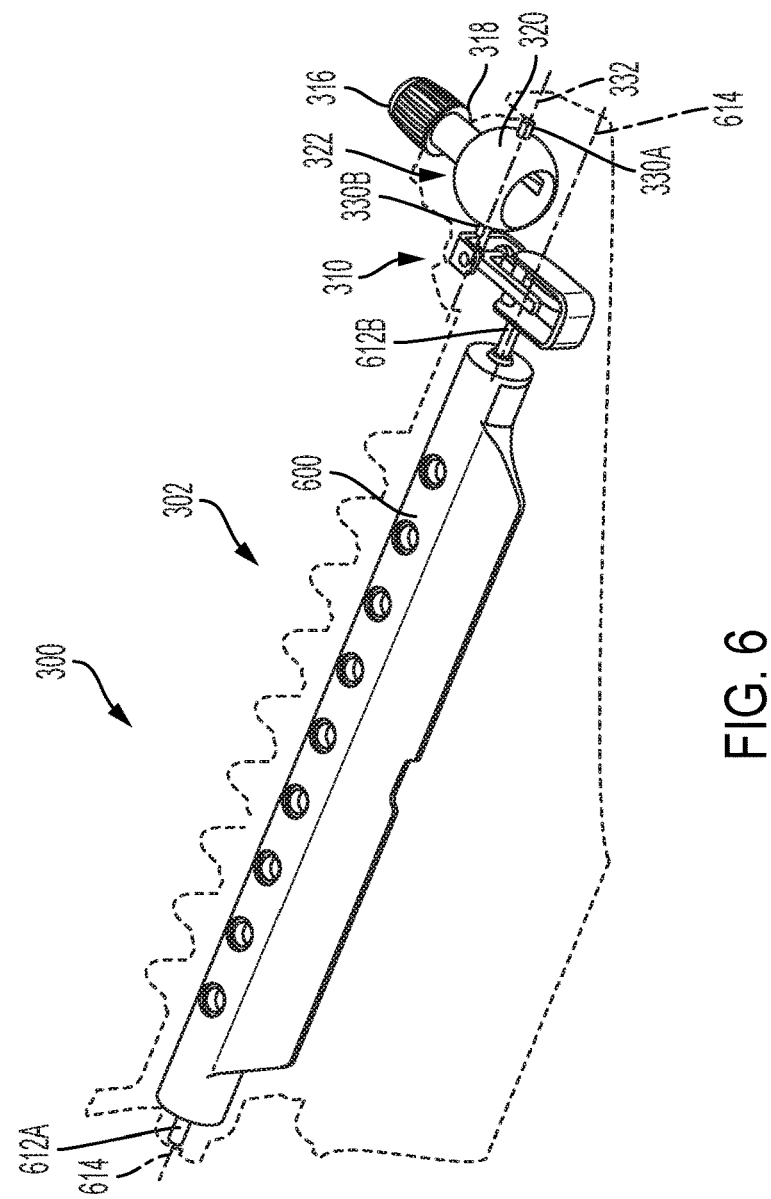
Figure 7B:
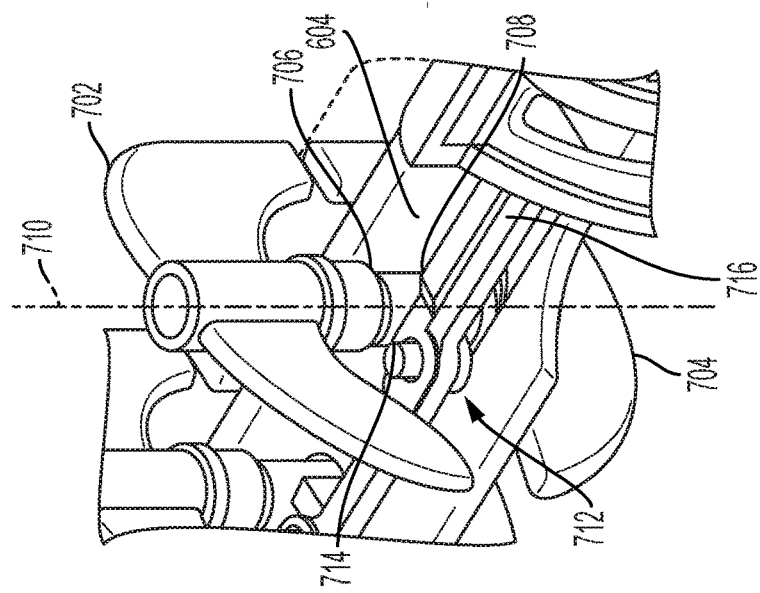
FIG. 7B provides a close-up perspective view of the secondary vane system 304.
Figure 7A:
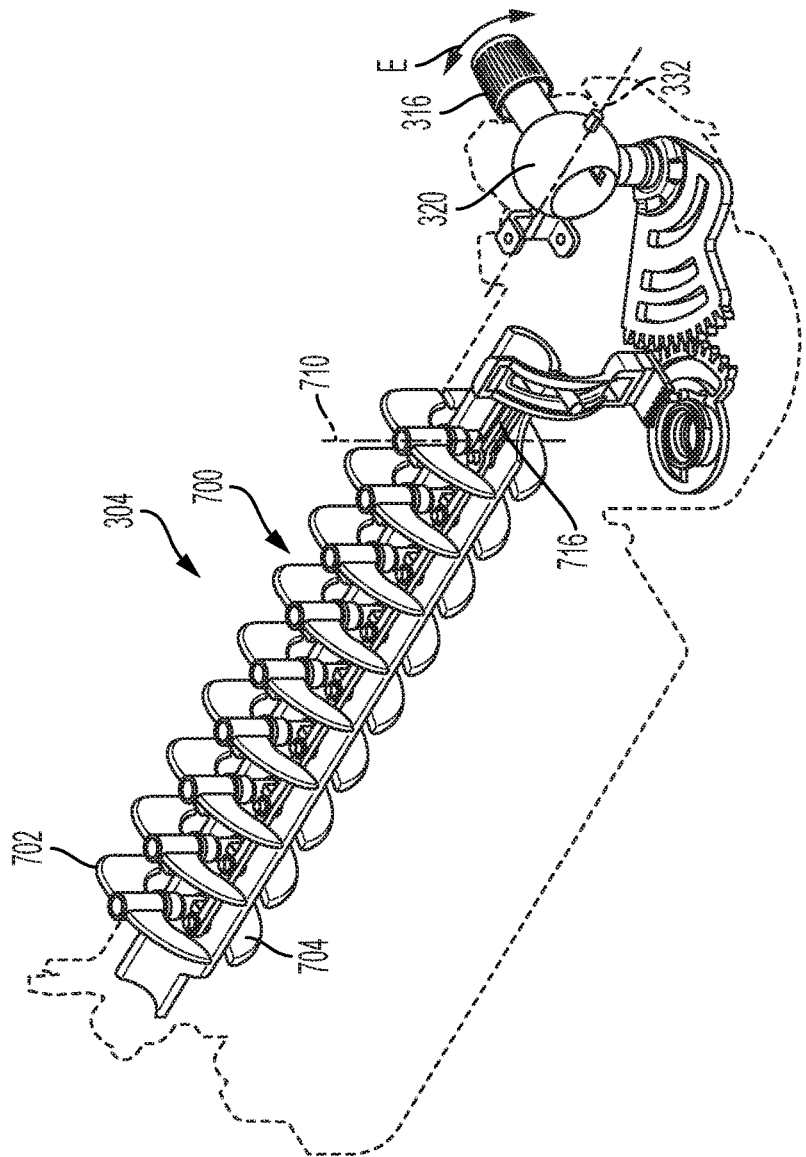
FIG. 7A illustrates a secondary vane system 304 of the exemplary vehicle air vent 300 of the present disclosure.
Figure 7C:
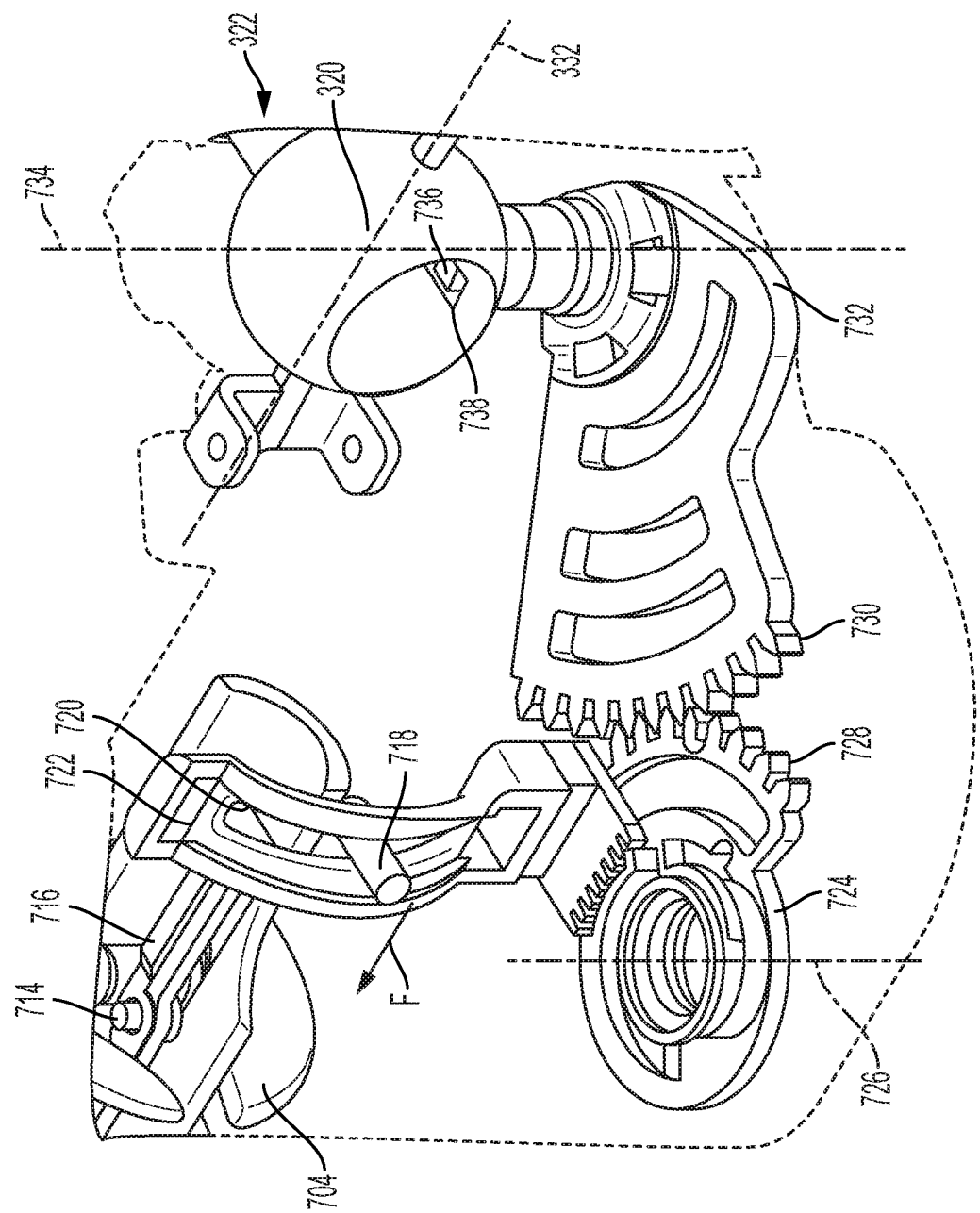
FIG. 7C provides another close-up perspective view of the secondary vane system 304.
Figure 8:
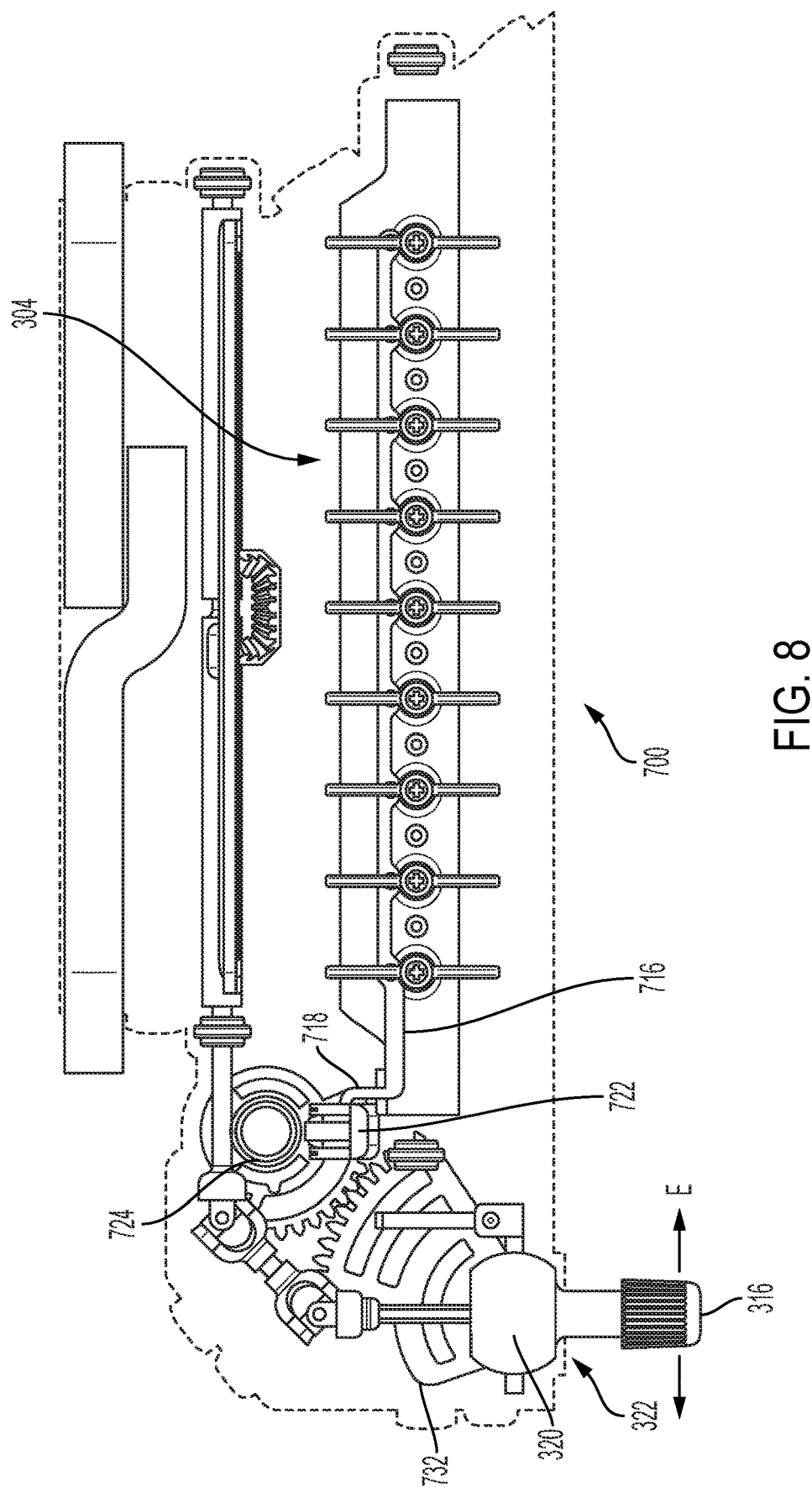
FIG. 8 provides a cross-sectional plan view of the secondary vane system 304.
Figure 9:
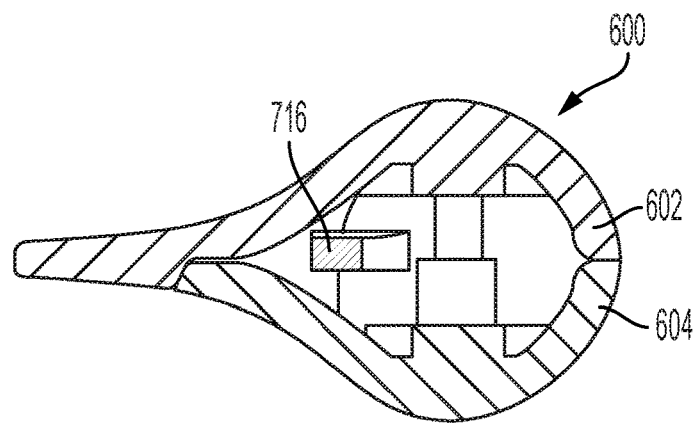
FIG. 9 provides a cross-sectional view of a primary vane 600 of the exemplary vehicle air vent 300 of the present disclosure.
Figure 10:
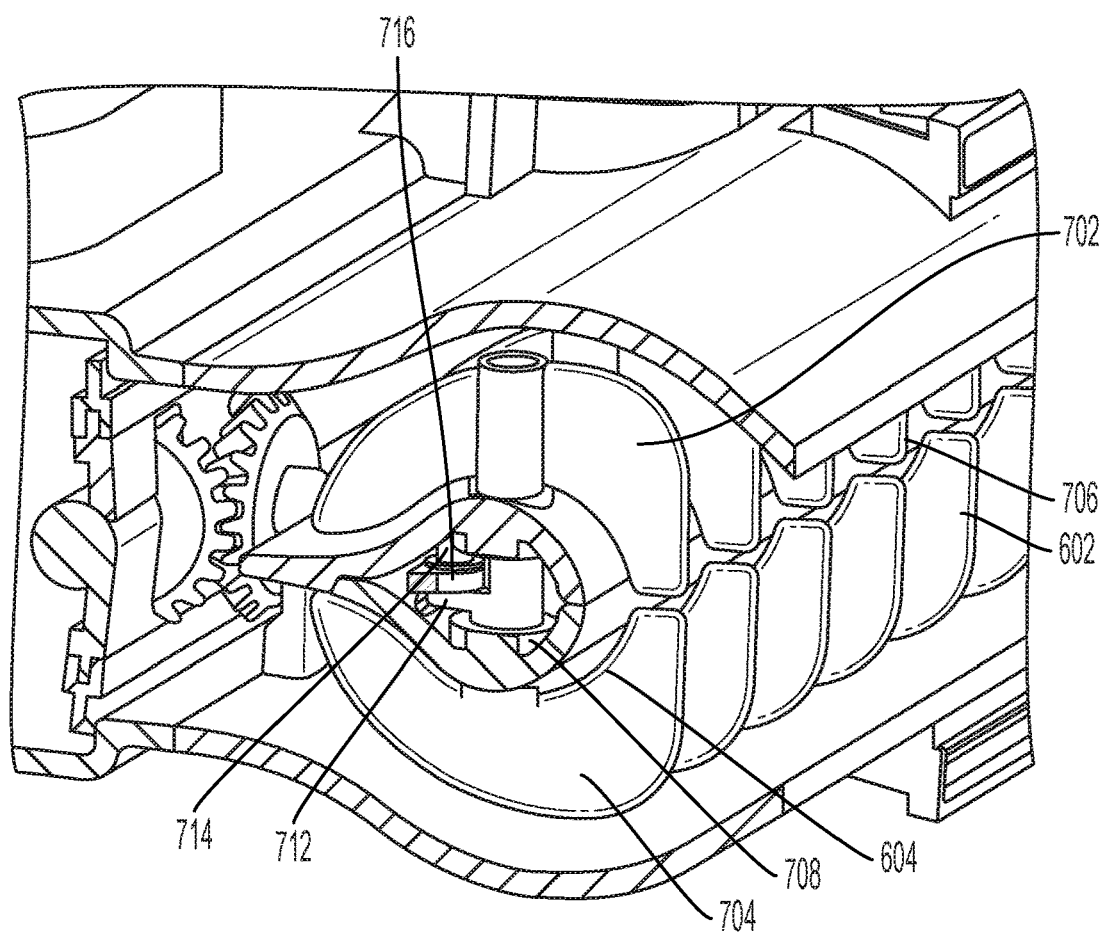
FIG. 10 provides yet another cross-sectional view of the secondary vane system 304.
Figures 11A, 11B:
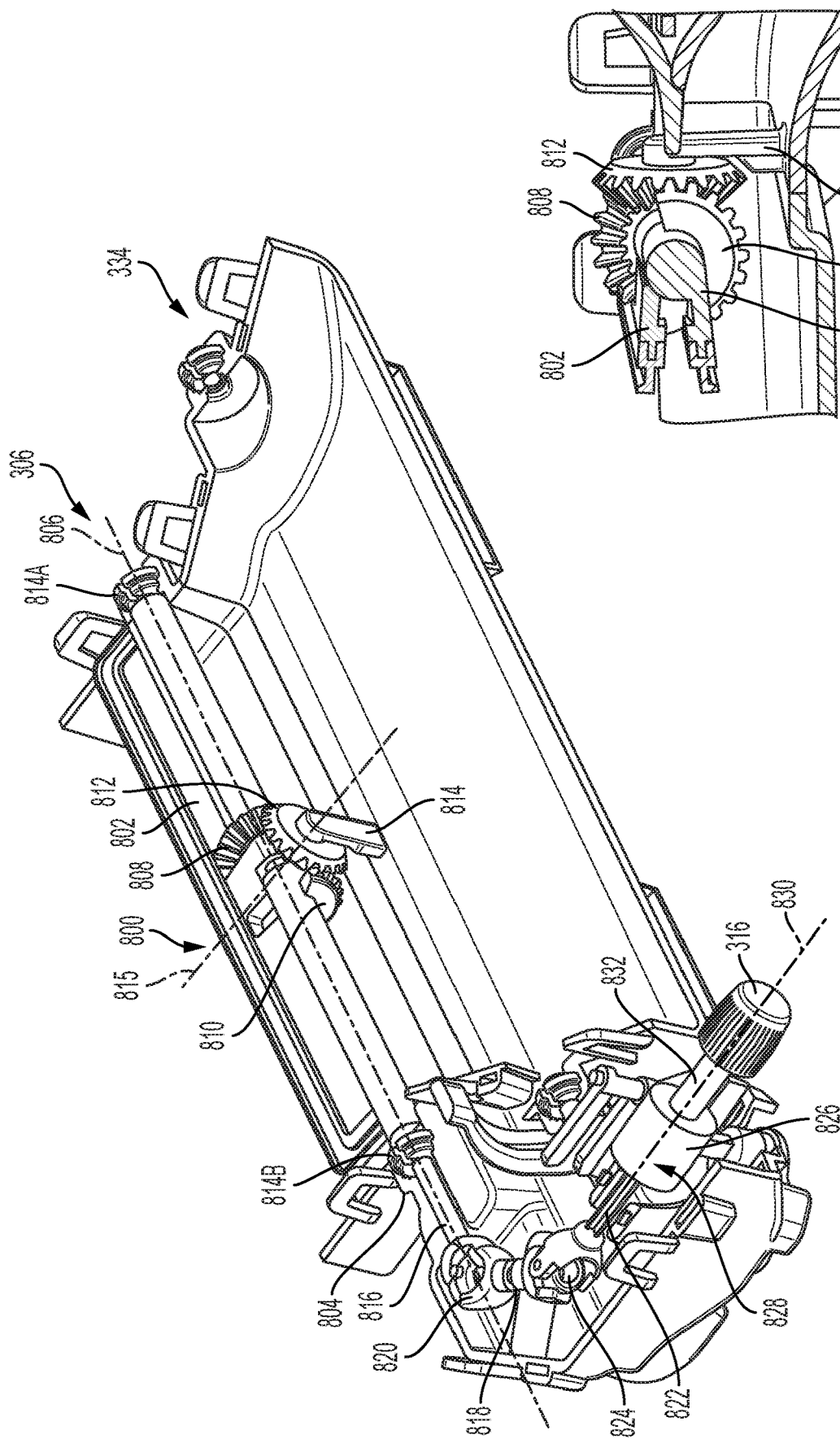
FIG. 11A illustrates an airflow volume control system 306 of the exemplary vehicle air vent 300 of the present disclosure in a substantially open configuration.
FIG. 11B provides a close-up cross-sectional view of the airflow volume control system 306 in the substantially open configuration.
Figures 12A, 12B:
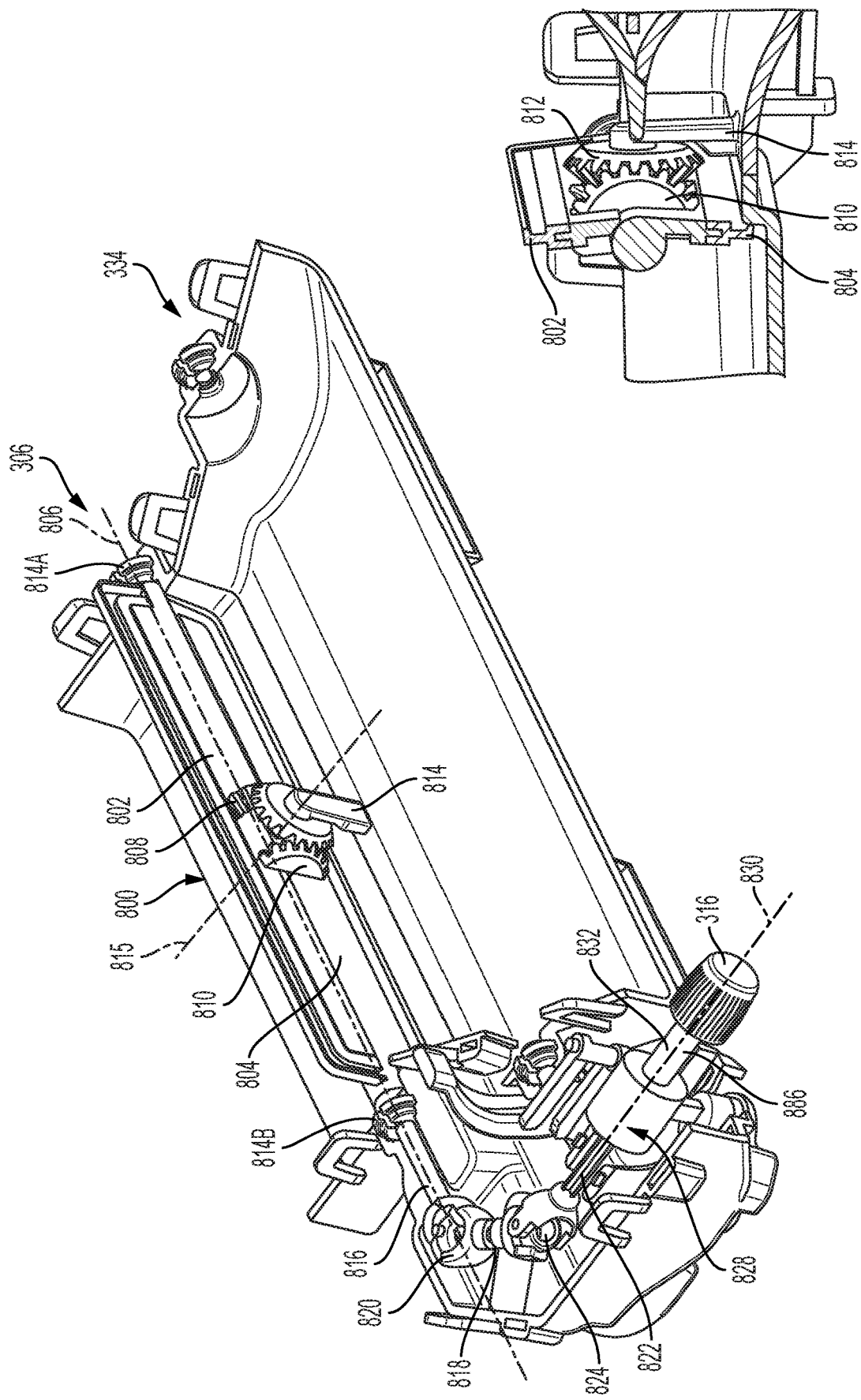
FIG. 12A illustrates the airflow volume control system 306 in a substantially closed configuration.
FIG. 12B provides a close-up cross-sectional view of the airflow volume control system 306 in the substantially closed configuration.
Figure 13:
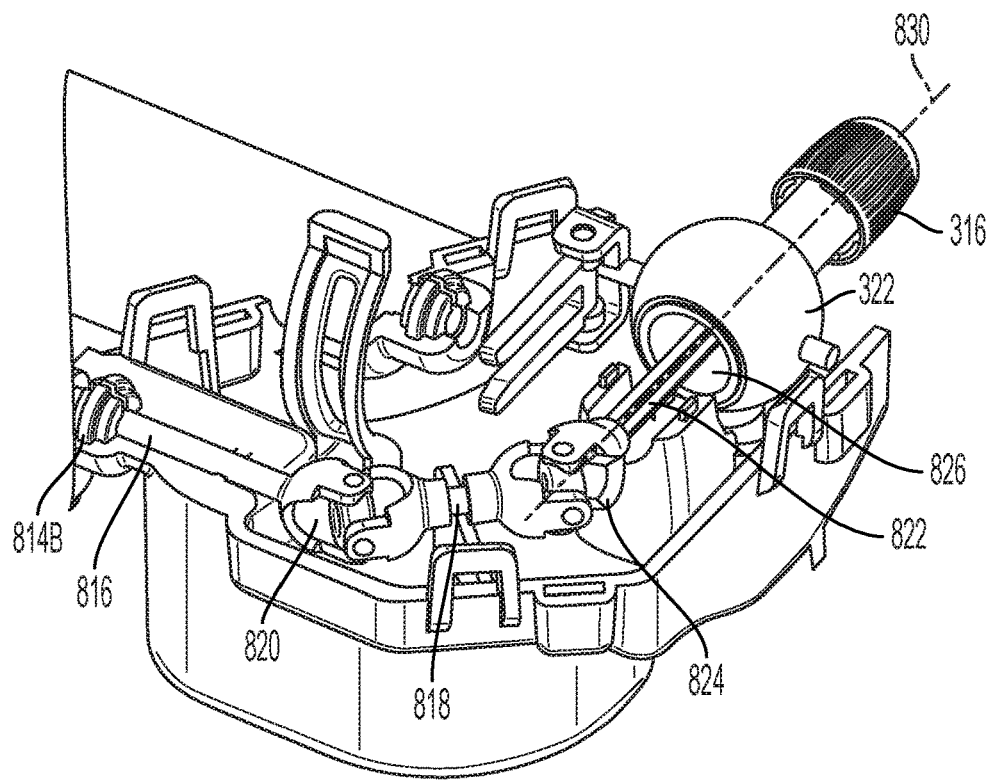
FIG. 13, provides a perspective view of a portion of the airflow volume control system 306.
Figure 14:
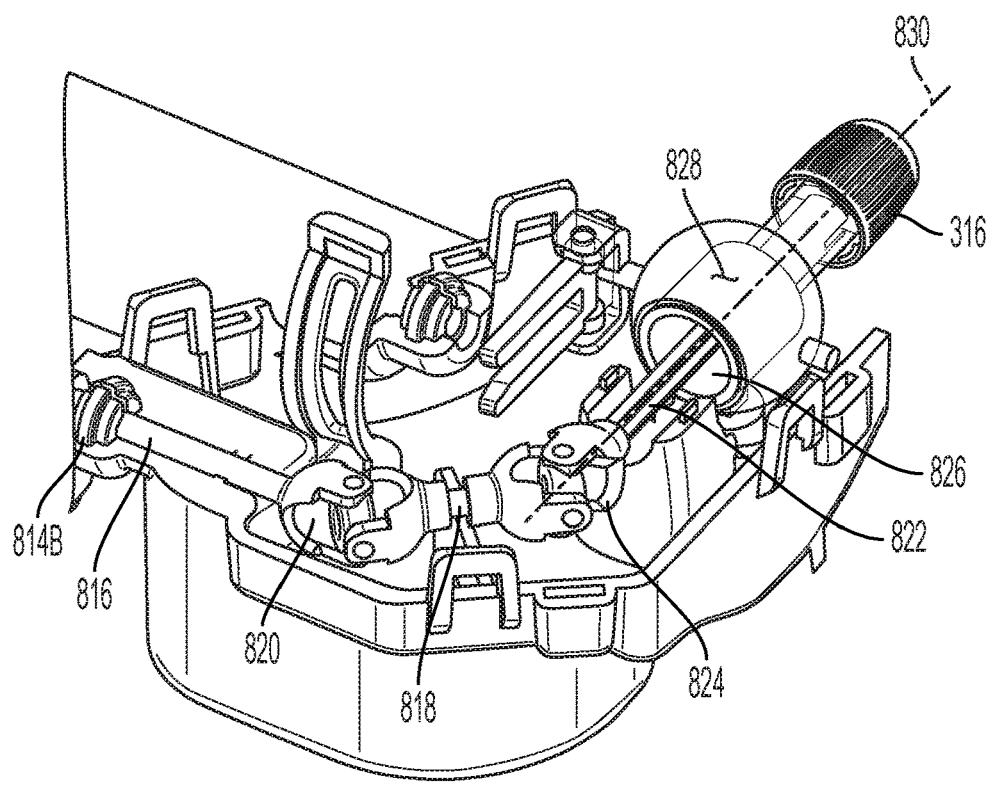
FIG. 14 provides another perspective view of a portion of the airflow volume control system 306.
Figure 15A:
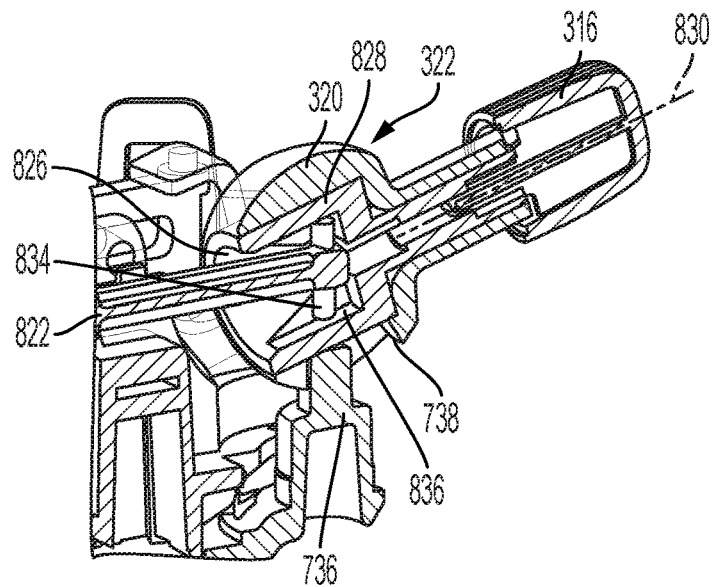
FIG. 15A provides a close-up cross-sectional perspective view of another portion of the airflow volume control system 306 with the joystick in an upward configuration.
Figure 15B:
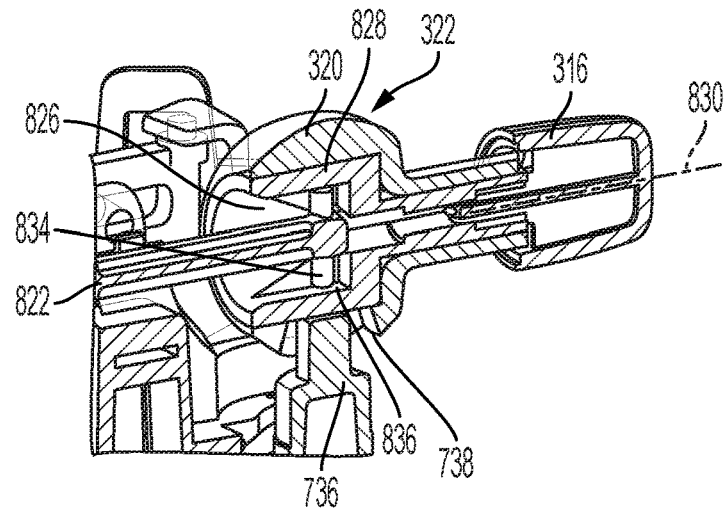
FIG. 15B provides a close-up cross-sectional perspective view of the airflow volume control system 306 with the joystick in substantially straight configuration.
Figure 15C:
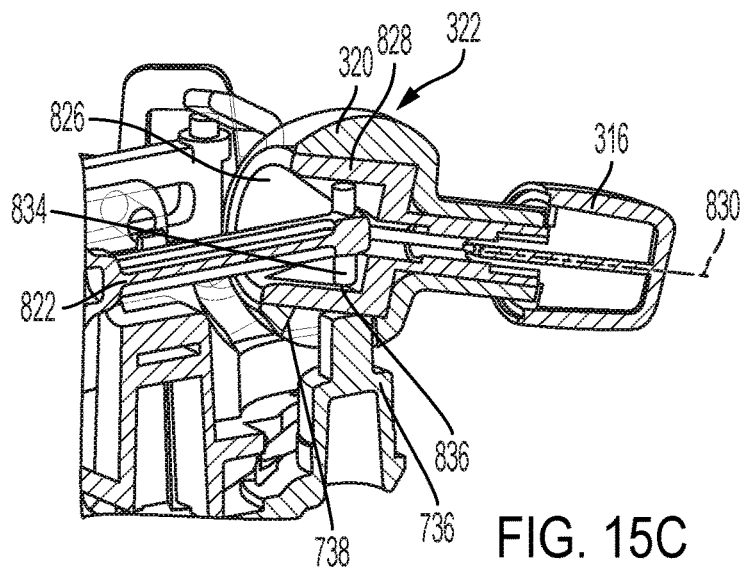
FIG. 15C provides a close-up cross-sectional perspective view of the airflow volume control system 306 with the joystick in a downward configuration.
Figure 16A:
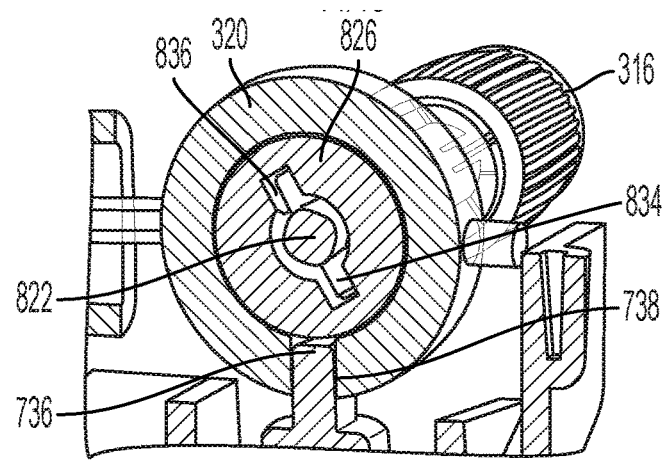
FIGS. 16A-16C illustrate another close-up cross-sectional perspective view of the airflow volume control system 306 with the joystick rotated in different positions.
Figure 16B:
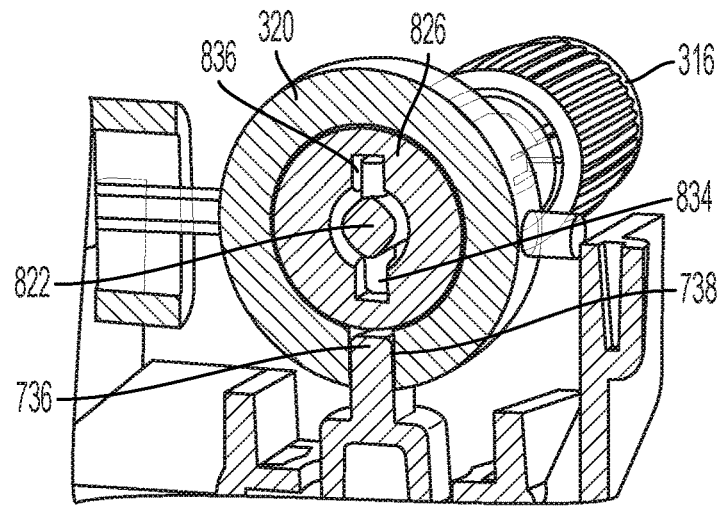
Figure 16C:
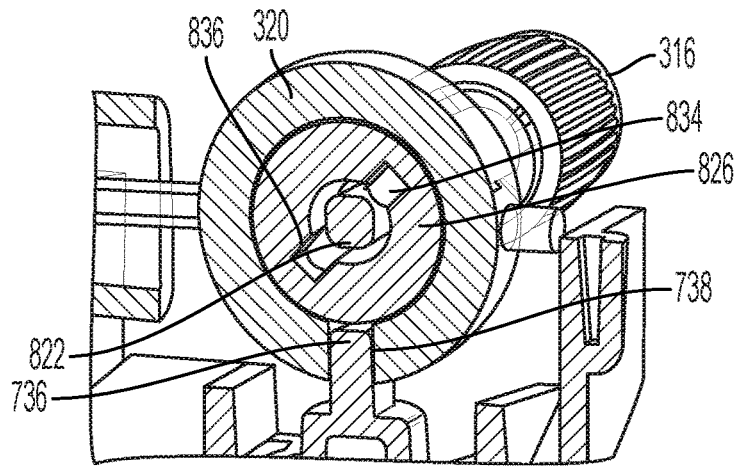

FIG. 6 illustrates the primary vane system 302 and primary vane controller 310 of the exemplary vehicle air vent 300 of the present disclosure. The primary vane system 302 includes a primary vane 600 that determines the direction of airflow out of the vehicle air vent 300 in an up/down direction. As illustrated in FIG. 9, which illustrates a cross-sectional view of the primary vane 600, the primary vane 600 includes an upper primary vane portion 602 and a lower primary vane portion 604. The joystick controller 308 includes a joystick knob 316 that engages a joystick shaft 318 extending from a spherical section 320 of a joystick body 322. The spherical section 320 of the joystick body 322 is held in position within the vehicle air vent 300 with a joystick sphere housing 324 (see FIGS. 4-5). The joystick sphere housing 324 may include a left side sphere housing 326 and a right side sphere housing 328, which when brought together, capture the spherical section 320 of the joystick body 322 in a manner which permits rotation in all directions, but does not permit translation of the joystick body 322. The spherical section 320 of the joystick body 322 includes primary vane pivots 330A and 330B which extend from the spherical section 320 along a primary axis 332. Pivoting of the joystick body 322 about the primary axis 332 defined by the primary vane pivots 330A and 330B determines the rotation of the primary vane 600.

Primary vane pivot 330B includes a hinge portion 606 extending from the primary vane pivot 330B. The hinge portion 606 is substantially u-shaped and is configured to pivotally engage primary vane fork 608. Primary vane fork 608 includes a pair of tines 610A and 610B which extend rearwardly from the pivot connection 612 with the hinge portion 606. The pivot connection 612 between the hinge portion 606 and the primary vane fork 608 permits the primary vane fork 608 to freely pivot in a side to side direction. The primary vane 600 includes pivot arms 612A and 612B that are pivotally captured by primary vane hinges (not shown) which enables the primary vane 600 to pivot about primary vane axis 614. A primary control arm 616 extends from one end of the primary vane 600. The primary control arm 616 includes a primary control arm shaft 618 which is aligned about an offset axis 620 that is offset from the primary vane axis 614. The primary control arm shaft 618 is captured between the tines 610A and 610B of the primary vane fork 608. With this configuration, movement of the joystick knob 316 in an up/down direction causes the joystick body 322 to rotate about primary vane pivots 330A and 330B. Rotation of the primary vane pivot 330B causes the hinge portion 606 to rotate which, in turn, causes the primary vane fork 608 to rotate about the primary axis 332. In response, the tines 610A and 610B move up or down and which causes the primary control arm shaft 618 of the primary control arm 616 to rotate about the primary vane axis 614. Rotation of the primary control arm 616 causes the rotation of the primary vane 600 about the primary vane axis 614. In this manner, movement of the joystick knob 316 in an up or down direction causes a corresponding rotation of the primary vane 600 which causes the air flow through the vehicle air vent 300 to be deflected up or down, respectively.

Referring now to FIGS. 7-10, the configuration and operation of the secondary vane system 304 is described. The secondary vane system 304 includes a plurality of secondary vanes 700 which each includes an upper secondary vane 702 and a lower secondary vane 704. Each of the upper secondary vanes 702 includes an upper secondary vane pivot shaft 706 which extends vertically downward through upper primary vane portion 602. Each of the lower secondary vanes 704 includes a lower secondary vane pivot shaft 708 which extends vertically upward through lower primary vane portion 604. The upper secondary vane pivot shaft 706 and lower secondary vane pivot shaft 708 are fixedly connected to each other and are freely rotatable about a vertical axis 710 that extends through the primary vane 600. Each of the lower secondary vanes 704 further includes a secondary vane arm 712 that extends rearwardly from the lower secondary vane pivot shaft 708 and which includes a secondary vane vertical protrusion 714 at a distal end of the secondary vane arm 712. Alternatively, the secondary vane arm 712 may extend from the upper secondary vane pivot shaft 706. Each of the secondary vane vertical protrusions 714 of the plurality of secondary vanes 700 is pivotally connected to a secondary vane control arm 716 that extends substantially completely through the primary vane 600 between the upper primary vane portion 602 and lower primary vane portion 604. The secondary vane control arm 716 includes a rearwardly extending arm 718 that engages a vertically oriented slot 720 in an arcuate arm 722. A lower portion of the arcuate arm 722 is fixed to a first gear 724. First gear 724 is pivotable about a first gear axis 726. First gear 724 include first gear teeth 728 that engage second gear teeth 730 of a second gear 732. The second gear 732 is rotatably pivotable about a second gear axis 734. The second gear 732 further includes a second gear key 736 which engages a slot 738 in a lower portion of the spherical section 320 of the joystick body 322. The slot 738 in the lower portion of the spherical section 320 is oriented in a forward/rearward orientation and engages the second gear key 736 in a manner which permits the spherical section 320 to rotate about the primary axis 332 without moving the second gear key 736, but which causes the second gear 732 to rotate about the second gear axis 734 when the spherical section 320 of the joystick body 322 rotates about the second gear axis 734.

Operation of the secondary vane system 304 will now be explained with reference to FIGS. 7A-10. Movement of the joystick knob 316 in a side to side motion E causes the spherical section 320 of the joystick body 322 to rotate about the second gear axis 734. Referring briefly back to FIG. 5, the spherical section 320 of the joystick body 322 includes a horizontal slots 740A and 740B along opposing sides of the spherical section 320 which permits the joystick knob 326 to move in a side to side motion without affecting operation of the primary vane system 302. In response to a side to side motion of the joystick knob 316, the engagement of the second gear key 736 in the slot 738 of the spherical section 320 of the joystick body 322 causes the second gear 732 to rotate about the second gear axis 734. Engagement between the second gear teeth 730 with the first gear teeth 728 then causes rotation of the first gear 724 about the first gear axis 726. In turn, the arcuate arm 722 will also pivot about the first gear axis 726 which causes the secondary vane control arm 716 to move in a side-to-side motion F because of the engagement of the rearwardly extending arm 718 of the secondary vane control arm 716 with the vertically oriented slot 720 of the arcuate arm 722. The vertically oriented slot 720 of the arcuate arm 722 permits the secondary vane control arm 716 to freely rotate about the primary vane axis 614 when the primary vane system 302 is operated without affecting side to side motion of the secondary vane control arm 716. Side-to-side motion of the secondary vane control arm 716 causes the plurality of secondary vanes 700 to pivot about the vertical axis 710 because of the pivotal engagement of the secondary vane vertical protrusion 714 of each of the secondary vanes 700 with the secondary vane control arm 716. In this manner, side-to-side motion of the joystick controller 308 causes a side-to-side pivoting of the plurality of secondary vanes 700 which results in a corresponding side-to-side deflection of air flowing through the vehicle air vent 300 by the plurality of secondary vanes 700.

Figure 17:
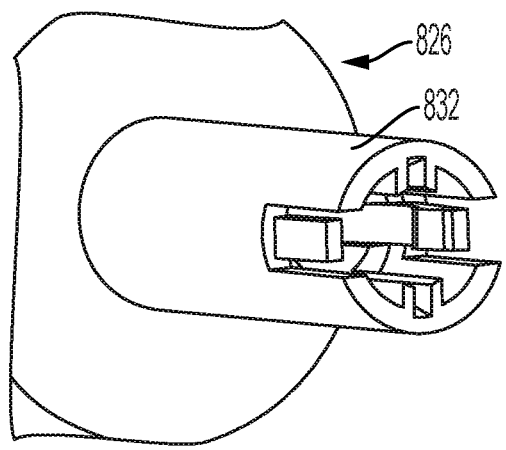
FIG. 17 is a perspective view of a portion of an inner joystick body 826 of the airflow volume control system 306.
Figure 18:
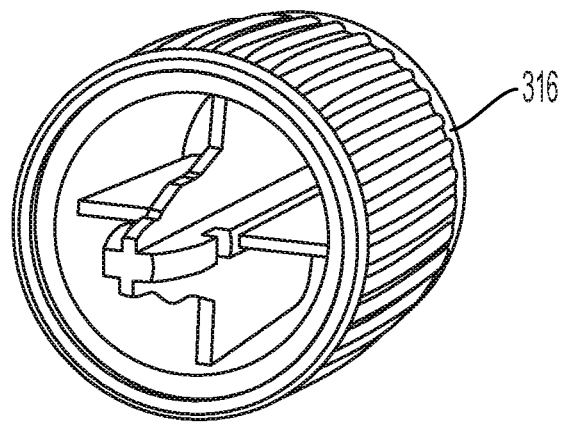
FIG. 18 is a perspective view of a joystick knob 316 of the vehicle air vent 300.
Figure 19:
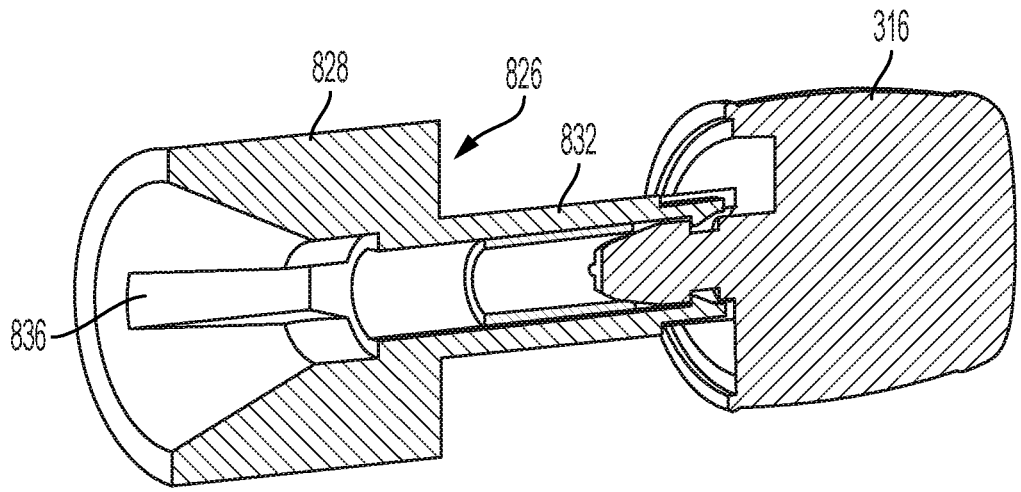
FIG. 19. is a cross-sectional perspective view of the joystick knob 316 mounted on the inner joystick body 826.

Referring now to FIGS. 11-19, the configuration and operation of the airflow volume control system 306 is described. The airflow volume control system 306 controls the volume of air flowing through the vehicle air vent 300. The airflow volume control system 306 includes a butterfly door 800 having an upper door 802 and a lower door 804 that are each pivotal about a door pivot axis 806. The upper door 802 includes an upper door gear 808 and the lower door 804 includes a lower door gear 810. Both of the upper door gear 808 and the lower door gear 810 are coaxial with the door pivot axis 806 and each of them engage opposing sides of a pinion gear 812. The pinion gear 812 is pivotally mounted on a pinion gear pivot 814 that is fixed with respect to the housing 334 of the vehicle air vent 300. In this manner, the pinion gear 812 is freely pivotal on a pinion gear axis 815. Both of the upper door 802 and the lower door 804 are supported by a shaft (not shown) which extends through both of the upper door 802 and lower door 804 along the door pivot axis 806 and which is supported at opposite ends by door bearings 814A and 814B. The lower door 804 further includes a lower door extension 816 which engages an intermediate door control arm 818 via a first universal joint 820. The intermediate control arm 818 is also connected at an opposite end to a joystick door control arm 822 via a second universal joint 824. The joystick door control arm 822 is connected to an inner joystick body 826. The inner joystick body 826 includes a cylindrical section 828 positioned within the spherical section 320 of the joystick body 322 in a manner which permits the inner joystick body 826 to rotate along joystick axis 830 relative to the joystick body 322. The inner joystick body 826 further includes a protruding shaft 832 on which the joystick knob 316 may be mounted as illustrated by FIGS. 17-19. The joystick door control arm 822 also includes a joystick key 834 that is positioned within an inner slot 836 in the cylindrical section 828 of the inner joystick body 826.

Operation of the airflow volume control system 306 will now be explained. In order to adjust the volume of airflow flowing through the vehicle air vent 300 a vehicle occupant may rotate the joystick knob 316 on the joystick axis 830. Rotation of the joystick knob 316 on the joystick axis 830 causes the inner cylindrical body 826 to also rotate along the joystick axis 830, which, in turn, also causes the joystick door control arm 822 to rotate about its axis. Rotation between the inner cylindrical body 826 to the joystick door control arm 822 is caused by the positioning of the joystick key 834 in the inner slot 836 of the inner cylindrical body

826. It is to be understood that this connection permits the transmission of this rotational motion without affecting or being affected by operation of either of the primary vane system 302 or the secondary vane system 304. Rotation of the joystick door control arm 822 is next transmitted to the lower door extension 816 of the lower door 804 via rotation of the second universal joint 824, intermediate door control arm 818, and the first universal joint 820, respectively. Rotation of the lower door 804 about the door pivot axis 806 results in rotation of the lower door gear 810 which causes rotation of the pinion gear 812 on the pinion gear axis 815. Rotation of the pinion gear 812 on the pinion gear axis 815 causes a rotation of the upper door gear 808 and the upper door 802 to which the upper door gear 808 is attached. In this manner, rotation of the joystick knob 316 results in an opening and/or closing of the butterfly door 800 of the airflow volume control system 306.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle air vent comprising:
    a primary vane system having a primary vane pivotal about a horizontal axis to direct an airflow from an outlet of the vehicle air vent in an up/down direction, wherein the primary vane includes an upper primary vane portion attached to a lower primary vane portion;
    a secondary vane system having a secondary vane pivotal about a vertical axis to direct an airflow from an outlet of the vehicle air vent in a side-to-side direction, wherein the primary vane of the primary vane system is co-located along an airflow path through the vehicle air vent with the secondary vane of the secondary vane system, and wherein the secondary vane system includes a secondary vane pivot shaft and a secondary vane control arm, wherein the secondary vane pivot shaft extends vertically through the primary vane, the secondary vane is pivotal relative to the primary vane about the secondary vane pivot shaft, a secondary vane arm extends from the secondary vane pivot shaft and engages the secondary vane control arm, and wherein the secondary vane control arm extends substantially completely through the primary vane between the upper primary vane portion and the secondary primary vane portion;
    an airflow volume control system having a butterfly door adapted to adjust the volume of airflow through the vehicle air vent; and
    a joystick controller adapted to independently operate the primary vane system, the secondary vane system, and the airflow volume control system.

2. The vehicle air vent of claim 1, wherein the secondary vane arm engages the secondary vane control arm at a position that is offset from the secondary vane pivot shaft, wherein the secondary vane control arm is connected to the joystick controller such that a side-to-side motion of the joystick controller pivots the secondary vane about the secondary vane pivot shaft to direct an airflow from the outlet of the vehicle air vent in the side-to-side direction.

3. The vehicle air vent of claim 1, wherein the joystick controller comprises:
    a joystick knob;
    a joystick body with a joystick shaft extending from a spherical section of the joystick body, wherein the joystick shaft engages the joystick knob;
    a joystick sphere housing that includes a left side sphere housing and a right side sphere housing that encloses the spherical section of the joystick body; and
    a primary vane pivot extending from the spherical section of the joystick body along a primary axis.

4. The vehicle air vent of claim 3, further comprising:
    a substantially u-shaped hinge portion extending from the primary vane pivot;
    a primary vane fork including a pair of tines extending rearwardly from a pivot connection with hinge portion extending from the primary vane pivot; and
    a primary control arm extending from the primary vane, wherein the primary control arm includes a primary control arm shaft that is aligned about an offset axis that is offset from a primary vane axis about which the primary vane is rotatable.

5. The vehicle air vent of claim 3, wherein the secondary vane comprises:
    an upper secondary vane that includes an upper secondary vane pivot shaft that extends vertically downward through the upper primary vane portion; and
    a lower secondary vane that includes a lower secondary vane pivot shaft that extends vertically upward through the lower primary vane portion, wherein the upper secondary vane pivot shaft and the lower secondary vane pivot shaft are fixedly connected to each other and are freely rotatable about a vertical axis that extends through the primary vane, and wherein one of the lower secondary vane and the upper secondary vane includes a vane arm that extends rearwardly from a respective vane pivot shaft and which includes a secondary vane vertical protrusion at a distal end of the secondary vane arm, and wherein the secondary vane vertical protrusion is pivotally connected to the secondary vane control arm.

6. The vehicle air vent of claim 5, further comprising:
    a rearwardly extending arm extending rearwardly form the secondary vane control arm;
    an arcuate arm with a vertically oriented slot, wherein the rearwardly extending arm extends into the vertically oriented slot;
    a first gear attached to a lower portion of the arcuate arm;
    a second gear having second gear teeth engaging first gear teeth on the first gear;
    a second gear key connected to the second gear that engages a slot in a lower portion of the spherical section of the joystick body, wherein the slot in the lower portion of the spherical section is oriented in a forward/rearward direction.

7. The vehicle air vent of claim 3, wherein:
    the butterfly door includes an upper door and a lower door that are each pivotal about a door pivot axis, wherein the upper door includes an upper door gear and the lower door includes a lower door gear; and
    further comprising:
    a pinion gear that is pivotally mounted on a pinion gear pivot that is fixed with respect to a housing of the vehicle air vent, wherein both of the upper door gear and the lower door gear are coaxial with the door pivot axis and each of them engage opposing sides of the pinion gear;

a lower door extension extending from the lower door;
an intermediate control arm connected to the lower door extension with a first universal joint; and
a joystick door control arm connected to the intermediate control arm with a second universal joint and to an inner joystick body, wherein the inner joystick body includes a cylindrical section positioned within the spherical section of the joystick body in a manner which permits the inner joystick body to rotate along a joystick axis relative to the joystick body, wherein the inner joystick body further comprises a protruding shaft on which the joystick knob is mounted, and wherein the joystick door control arm also includes a joystick key that is positioned within an inner slot in the cylindrical section of the inner joystick body.

8. A vehicle air vent comprising:
a primary airflow control vane pivotal about a horizontal axis to direct an airflow from an outlet of the vehicle air vent in an up/down direction;
a plurality of secondary airflow control vanes pivotal about a vertical axis and a plurality of secondary vane pivot shafts to direct an airflow from an outlet of the vehicle air vent in a side-to-side direction, wherein the primary airflow control vane is co-located along an airflow path through the vehicle air vent with the plurality of secondary airflow control vanes;
a plurality of secondary vane arms extending from the secondary vane pivot shafts;
a secondary vane control arm engaged with the plurality of secondary vane arms, wherein the secondary vane control arm extends substantially completely through and within the primary vane;
a rearwardly extending arm extending rearwardly form the secondary vane control arm;
an arcuate arm with a vertically oriented slot, wherein the rearwardly extending arm extends into the vertically oriented slot;
a first gear attached to a lower portion of the arcuate arm;
a second gear having second gear teeth engaging first gear teeth on the first gear;
a second gear key connected to the second gear;
an airflow volume control system having a butterfly door adapted to adjust the volume of airflow through the vehicle air vent; and
a joystick controller adapted to independently operate the primary airflow control vane, the plurality of second airflow control vanes, and the airflow volume control system, wherein the second gear key engages a slot in a lower portion of a spherical section of the joystick body, wherein the slot in the lower portion of the spherical section is oriented in a forward/rearward direction.

9. The vehicle air vent of claim 8, wherein the secondary vane arm engages the secondary vane control arm at a position that is offset from the secondary vane pivot shaft, wherein the secondary vane control arm is connected to the joystick controller such that a side-to-side motion of the joystick controller pivots the secondary vane about the secondary vane pivot shaft to direct an airflow from the outlet of the vehicle air vent in the side-to-side direction.

10. The vehicle air vent of claim 8, wherein the joystick controller comprises:
a joystick knob;
a joystick body with a joystick shaft extending from a spherical section of the joystick body, wherein the joystick shaft engages the joystick knob;
a joystick sphere housing that includes a left side sphere housing and a right side sphere housing that encloses the spherical section of the joystick body; and
a primary vane pivot extending from the spherical section of the joystick body along a primary axis.

11. The vehicle air vent of claim 10, further comprising:
a substantially u-shaped hinge portion extending from the primary vane pivot;
a primary vane fork including a pair of tines extending rearwardly from a pivot connection with hinge portion extending from the primary vane pivot; and
a primary control arm extending from the primary airflow control vane, wherein the primary control arm includes a primary control arm shaft that is aligned about an offset axis that is offset from a primary vane axis about which the primary airflow control vane is rotatable.

12. The vehicle air vent of claim 10, wherein the primary airflow control vane comprises an upper primary airflow control vane portion attached to a lower primary airflow control vane portion.

13. The vehicle air vent of claim 12, wherein each of the secondary airflow control vanes comprises:
an upper secondary vane that includes an upper secondary vane pivot shaft that extends vertically downward through the upper primary vane portion; and
a lower secondary vane that includes a lower secondary vane pivot shaft that extends vertically upward through the lower primary vane portion, wherein the upper secondary vane pivot shaft and the lower secondary vane pivot shaft are fixedly connected to each other and are freely rotatable about a vertical axis that extends through the primary airflow control vane, wherein one of the lower secondary vane and the upper secondary vane includes a vane arm that extends rearwardly from a respective vane pivot shaft and which includes a secondary vane vertical protrusion at a distal end of the secondary vane arm, and wherein the secondary vane vertical protrusion is pivotally connected to the secondary vane control arm.

14. The vehicle air vent of claim 10, wherein:
the butterfly door includes an upper door and a lower door that are each pivotal about a door pivot axis, wherein the upper door includes an upper door gear and the lower door includes a lower door gear; and
further comprising:
a pinion gear that is pivotally mounted on a pinion gear pivot that is fixed with respect to a housing of the vehicle air vent, wherein both of the upper door gear and the lower door gear are coaxial with the door pivot axis and each of them engage opposing sides of the pinion gear;
a lower door extension extending from the lower door;
an intermediate control arm connected to the lower door extension with a first universal joint; and
a joystick door control arm connected to the intermediate control arm with a second universal joint and to an inner joystick body, wherein the inner joystick body includes a cylindrical section positioned within the spherical section of the joystick body in a manner which permits the inner joystick body to rotate along a joystick axis relative to the joystick body, wherein the inner joystick body further comprises a protruding shaft on which the joystick knob is mounted, and wherein the joystick door control arm also includes a joystick key that is positioned within an inner slot in the cylindrical section of the inner joystick body.

* * * * *